US011490256B2

(12) United States Patent
Murthy et al.

(10) Patent No.: US 11,490,256 B2
(45) Date of Patent: Nov. 1, 2022

(54) SECURE ZERO-TOUCH PROVISIONING OF NETWORK DEVICES IN AN OFFLINE DEPLOYMENT

(71) Applicant: HEWLETT PACKARD ENTERPRISE DEVELOPMENT LP, Houston, TX (US)

(72) Inventors: Sriram Murthy, Bangalore (IN); Sumit Kumar, Bangalore (IN); Jacob Philip Michael, Bangalore (IN); Gopal Gupta, Bangalore (IN); Amit Kumar Gupta, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 377 days.

(21) Appl. No.: 16/298,144

(22) Filed: Mar. 11, 2019

(65) Prior Publication Data

US 2020/0296586 A1 Sep. 17, 2020

(51) Int. Cl.
*H04W 12/069* (2021.01)
*H04L 12/46* (2006.01)
(Continued)

(52) U.S. Cl.
CPC ......... *H04W 12/069* (2021.01); *H04L 9/0643* (2013.01); *H04L 12/4641* (2013.01); *H04L 61/5014* (2022.05); *H04W 80/02* (2013.01)

(58) Field of Classification Search
CPC ............. H04L 61/2015; H04L 12/4641; H04L 63/0876; H04L 63/061; H04L 9/0643; H04W 80/02; H04W 12/069
(Continued)

(56) References Cited

U.S. PATENT DOCUMENTS 6,199,204 B1 3/2001 Donohue
6,510,466 B1 1/2003 Cox et al.
(Continued)

FOREIGN PATENT DOCUMENTS

CN 105071959 11/2015
KR 20140068261 A * 6/2014 ............ H04W 12/03

OTHER PUBLICATIONS

Michael Armbrust et al., "A View of Cloud Computing," Communications of the ACM, Apr. 2010, pp. 50-58, vol. 53, No. 4, ACM.
(Continued)

*Primary Examiner* — Umar Cheema
*Assistant Examiner* — John Fan
(74) *Attorney, Agent, or Firm* — Nolte Intellectual Property Law Group (57) ABSTRACT

Systems and methods are provided for new network device provisioning without Internet access. One method may include a method of network device provisioning without Internet access, the method including entering a pre-shared key (PSK) in a dynamic host configuration protocol (DHCP) message, obtaining the PSK from a set of DHCP message options by an onboarding network device requesting to join a private network, presenting the PSK, by the onboarding network device, to a network management system (NMS) of the private network, validating the PSK by the NMS, and updating an inventory list of the NMS to include the onboarding network device in the inventory list.

20 Claims, 6 Drawing Sheets

(51) Int. Cl.
*H04W 80/02* (2009.01)
*H04L 9/06* (2006.01)
*H04L 61/5014* (2022.01)

(58) Field of Classification Search
USPC ........................................................ 380/277
See application file for complete search history.

(56) References Cited

U.S. PATENT DOCUMENTS

| | | | |
|---|---|---|---|
| 7,050,946 B2 | 5/2006 | Delegue et al. | |
| 7,069,293 B2 | 6/2006 | Cox et al. | |
| 7,130,897 B2 | 10/2006 | Dervin et al. | |
| 7,146,412 B2 | 12/2006 | Turnbull | |
| 8,341,250 B2 | 12/2012 | Pritikin et al. | |
| 8,489,834 B1 | 7/2013 | Kumbhari | |
| 8,640,198 B2 | 1/2014 | Raleigh | |
| 8,887,144 B1 | 11/2014 | Marr et al. | |
| 9,130,837 B2 | 9/2015 | Biarnason et al. | |
| 9,325,575 B2 * | 4/2016 | Gray ................ | H04L 41/0806 |
| 9,559,903 B2 | 1/2017 | Edwards | |
| 9,973,467 B2 | 5/2018 | Dhulipala et al. | |
| 2006/0174319 A1 | 8/2006 | Kraemer et al. | |
| 2006/0280183 A1 | 12/2006 | Chen et al. | |
| 2008/0049644 A1 | 2/2008 | Halbert | |
| 2008/0155659 A1 * | 6/2008 | Gazier ................ | H04L 63/0884 |
| | | | 726/4 |
| 2009/0132682 A1 | 5/2009 | Counterman | |
| 2009/0319635 A1 | 12/2009 | Christopherson et al. | |
| 2010/0293269 A1 * | 11/2010 | Wilson ................ | H04L 41/5054 |
| | | | 709/224 |
| 2010/0306352 A1 | 12/2010 | Pritikin et al. | |
| 2010/0306354 A1 | 12/2010 | Dehaan et al. | |
| 2011/0145392 A1 | 6/2011 | Dawson et al. | |
| 2011/0289200 A1 | 11/2011 | Patil et al. | |
| 2012/0016915 A1 | 1/2012 | Choi et al. | |
| 2012/0221684 A1 | 8/2012 | Ferris | |
| 2012/0254119 A1 | 10/2012 | Kumarasamy et al. | |
| 2012/0266209 A1 * | 10/2012 | Gooding ................ | H04L 63/20 |
| | | | 726/1 |
| 2012/0303696 A1 | 11/2012 | Kim | |
| 2013/0031224 A1 | 1/2013 | Nachtrab et al. | |
| 2013/0054763 A1 | 2/2013 | Van et al. | |
| 2013/0061049 A1 * | 3/2013 | Irvine ................ | G06F 21/6218 |
| | | | 713/165 |
| 2013/0173900 A1 | 7/2013 | Liu | |
| 2013/0211546 A1 | 8/2013 | Lawson et al. | |
| 2013/0232497 A1 | 9/2013 | Jalagam et al. | |
| 2013/0262390 A1 | 10/2013 | Kumarasamy et al. | |
| 2013/0346260 A1 | 12/2013 | Jubran et al. | |
| 2014/0032920 A1 | 1/2014 | Gehrmann et al. | |
| 2014/0047342 A1 | 2/2014 | Breternitz et al. | |
| 2014/0049365 A1 | 2/2014 | Ahearn et al. | |
| 2014/0280940 A1 | 9/2014 | Chapman et al. | |
| 2014/0379536 A1 | 12/2014 | Varma et al. | |
| 2015/0009861 A1 | 1/2015 | Balazs et al. | |
| 2015/0356094 A1 | 12/2015 | Gorelik | |
| 2015/0373001 A1 * | 12/2015 | Schatzmann ....... | H04L 41/0803 |
| | | | 726/6 |
| 2016/0080502 A1 * | 3/2016 | Yadav .................. | G06F 16/285 |
| | | | 709/227 |
| 2016/0337190 A1 * | 11/2016 | Wachter ................ | H04W 76/10 |
| 2017/0024261 A1 | 1/2017 | Atluri et al. | |
| 2018/0063000 A1 | 3/2018 | Wu et al. | |
| 2018/0083830 A1 | 3/2018 | Pendleton et al. | |
| 2018/0213036 A1 | 7/2018 | Vasetsky et al. | |
| 2020/0267216 A1 | 8/2020 | Haggart et al. | |

OTHER PUBLICATIONS

Froehlich, A., The On-premises Vs. Cloud-managed WLAN Architecture Debate, (Web Page), Retrieved Mar. 26, 2019, 8 Pgs.

Dikaiakos et al., "Cloud Computing: Distributed Internet Computing for IT and Scientific Research", IEEE, Internet Computing, Sep./Oct. 2009, pp. 10-13.

Daniel Nurmi et al., "The Eucalyptus Open-source Cloud-computing System," 9th IEEE/ACM International Symposium on Cluster Computing and the Grid, 2009, pp. 124-131, IEEE.

"elasticsearch-dump", taskrabbit, available online at <https://web.archive.org/web/20170227213250/https://github.com/taskrabbit/elasticsearch-dump>, Feb. 27, 2017, 7 pages.

"cassandradump", available online at <https://web.archive.org/web/20150703063319/https://github.com/gianlucaborello/cassandradump>, Jul. 3, 2015, 3 pages.

Winstanley, P., Implementing Windows Autopilot—The Future of Device Deployment, (Web Page), Retrieved Oct. 19, 2018, 18 Pgs.

* cited by examiner

SECURE ZERO-TOUCH PROVISIONING OF NETWORK DEVICES IN AN OFFLINE DEPLOYMENT

BACKGROUND

Computer networks are composed of various hardware and software components and devices including switches, routers, concentrators, gateways, repeaters, wired and wireless media, workstations, various types of servers, and the like. In a network, new devices are often added by joining the network. Some of the new devices, such as switches and workstations, may need configuration parameters and data that are provisioned to them when they join the network.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Further, as used herein, the article "a" is intended to have its ordinary meaning in the patent arts, namely "one or more." Herein, the term "about" when applied to a value generally means within the tolerance range of the equipment used to produce the value, or in some examples, means plus or minus 10%, or plus or minus 5%, or plus or minus 1%, unless otherwise expressly specified. Further, herein the term "substantially" as used herein means a majority, or almost all, or all, or an amount with a range of about 51% to about 100%, for example. Moreover, examples herein are intended to be illustrative only and are presented for discussion purposes and not by way of limitation.

In one network device deployment scenario, network device manufacturers and/or vendors provide access points to a network service provider. The network service provider may provision the access points, or other network devices such as switches and concentrators, for a particular customer by configuring each access point (or other network device) with particular settings desired by the particular customer (for example, encryption type, power levels, name, etc.). An access point is a computer communication network device or facility that provides a user with access to a network, such as a local area network (LAN) or the Internet, for sending and receiving data. Access points may be provisioned by network service providers. Thereafter, the access point is re-labeled and re-shipped to the particular customer for deployment. This provisioning scheme tends to be costly and may also substantially delay deployment of needed wireless networking equipment, which are not desirable.

Another deployment scenario involves a corporation having a dedicated facility for configuring access points. Access points are sent from a network device manufacturer/vendor to the facility. After configuring at the facility, the access point intended for use by a remote employee of the corporation is sent from the facility for subsequent deployment by the employee. This provisioning scheme is also costly and inefficient due to additional shipping and labor costs.

Yet another deployment scenario involves a corporation re-shipping an unprovisioned access point received from a network device manufacturer/vendor to an employee along with instructions as to how to provision and configure the access point. This deployment scenario is costly from a loss of labor perspective as the employee is required to allocate time from work for such deployment.

Generally, a network management system (NMS) may provision new network devices that request joining its network in one of two ways: online and offline. The "online" approach means provisioning an unprovisioned network device while having access to a wide-area computer network, like the Internet, and while data sources being accessible through that network. The "offline" approach means provisioning an unprovisioned network device while having no access to a wide-area computer network. The foregoing scenarios describe largely offline scenarios. In the online case, the NMS can validate the network device by accessing, for comparison, remote services having the records of all network devices shipped to the customer.

In the online scenario, the NMS may have access to the internet and cloud-based provisioning services. Through communication with such cloud-based services, the NMS may retrieve a validated list of network devices shipped to the customer. Any network device attempting to communicate with or onboard onto the NMS is first verified against this list to ascertain if the device is a trusted network device shipped to the customer. Onboarding in a network context means assigning a network address to a network device that is authorized to join a network and allowing the network device to send and receive data via the network.

In the offline scenario, no such direct comparison is possible. In some existing solutions, a dynamic host configuration protocol (DHCP) server is configured to publish vendor-specific options. When the network device is connected to the network, it uses the DHCP options to identify and communicate with the customer NMS. However, nontrusted devices can impersonate the trusted ones and pose a security risk. This is because the NMS does not have access to a validated list of network devices shipped to the customer. When a network device attempts to communicate or onboard onto the NMS, the NMS has no way to ascertain if the device is a trusted or authorized network device shipped to the customer.

Zero-touch provisioning in offline deployments is accomplished in existing systems by configuring a DHCP server to publish vendor-specific options at the enterprise customer site. When the network device is powered on, it uses the DHCP options to identify and communicate with an NMS or controller entity for the enterprise network. In utilizing this method, the NMS assumes it can trust any network device that connects to it from within the same subnet as the NMS and is serviced by the DHCP server. A non-authorized device or any network device that imitates an authorized device's communication flows can take advantage of this assumed trust relationship to get on-boarded onto the NMS, creating potential security breaches. The customer can address this security issue by manually ingesting or importing a list of trusted (authorized) network devices into the NMS. However, as the number of devices increases, this process becomes costly, error-prone, and unreliable.

Accordingly, the present disclosure is directed to systems and methods for network device provisioning without Internet access that address the aforementioned trust problem in an offline scenario. In one or more examples, the systems and methods disclosed herein may include a two-stage validation of the network device. In the first stage of validation of the network device, the customer adds a pre-shared key (PSK) on the DHCP server as part of the DHCP vendor-specific options of a DHCP message. The same PSK is added to a list of trusted PSKs stored on the NMS. The network device trying to join presents the PSK from the DHCP server to the NMS, which in turn compares it to its copy of the PSK to validate.

In the second stage of validation of the network device, the NMS verifies that the network device was procured by the customer and is trusted. A single file containing a hash of unique identifiers, such as a Media Access Control (MAC) address or serial number, of all devices purchased by the customer, is generated and made available to the customer NMS. The hash file may be stored on a computer-readable medium, such as a magnetic hard disk, an optical disc, a data tape, non-volatile memory, and other non-transitory data medium. During network device-onboarding (joining customer network), the NMS verifies the unique ID of the requesting device against the hash file. Once the network device is validated, the NMS uses the details fetched during and after onboarding to update the NMS's device inventory list. The two-stage validation of a network device for the offline scenario is further described below with respect to the figures.

Figure 1:
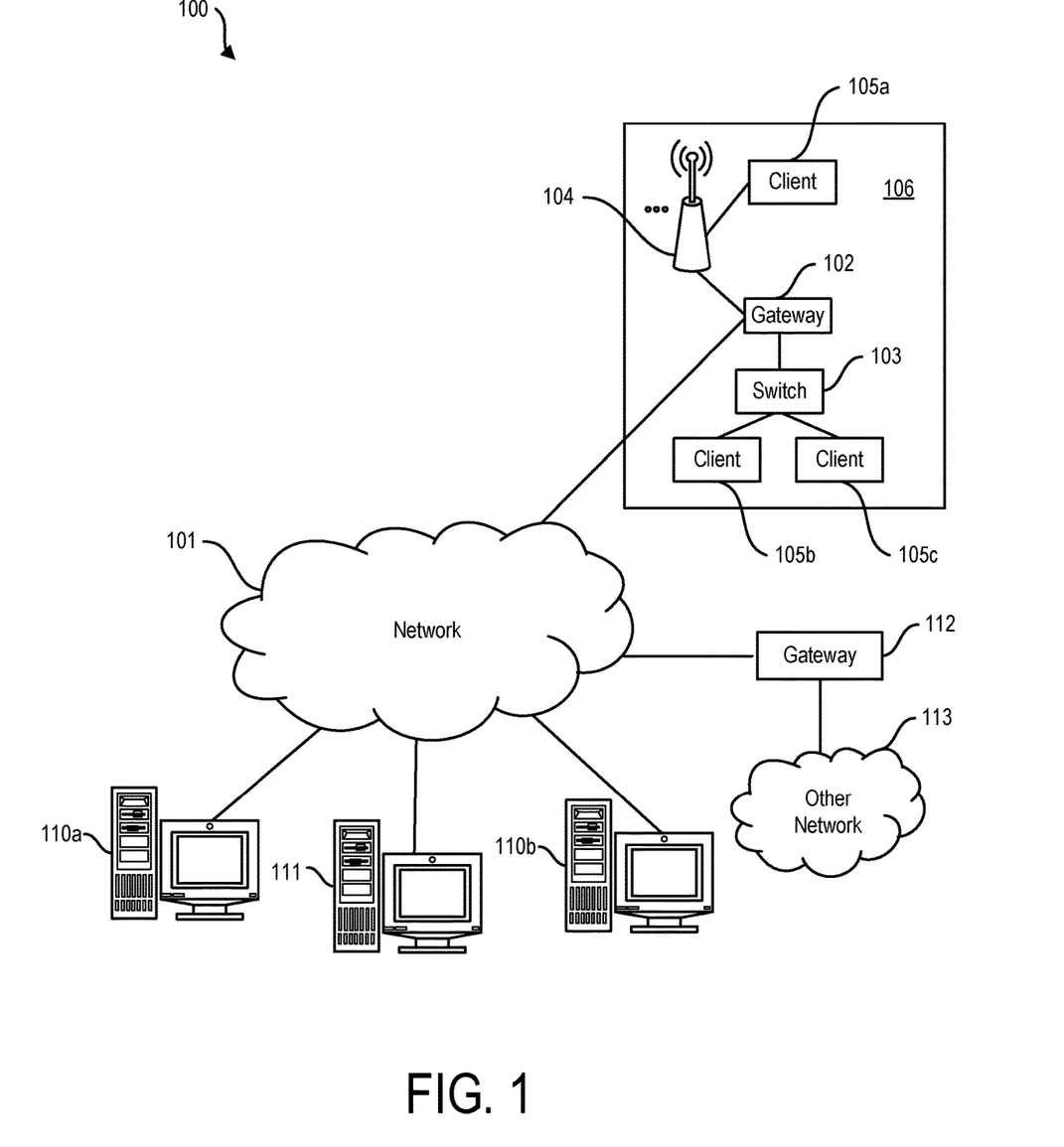
FIG. 1 is an enterprise network system, according to one or more examples of the disclosure.

Turning now to the drawings, FIG. 1 is an enterprise network system 100, according to one or more examples of the disclosure. In some example implementations, the enterprise network system 100 is a private network that includes a computer network 101 coupled via a gateway 102 to a remote network 106. Remote network 106 may further include a switch 103 and an access point 104. The access point 104 may be connected to one or more client devices 105a and the switch 103 may be connected to one or more client devices 105b and 105c. The computer network 101 may be further coupled with one or more servers 110a, 110b, and DHCP server 111. The computer network 101 may also be coupled with other networks 113 via one or more gateways 112 (one shown).

Various network devices may join or leave the enterprise network system 100, some of which may need to be provisioned with various data to function within the enterprise network system 100. The provisioning of network devices may be done by various entities, such as the manufacturer of the network device or the customer, and it may be done online (via transfer of provisioning data over a network such as a LAN or the Internet) or offline.

Those skilled in the relevant arts will appreciate that the servers 110a, 110b, and the DHCP server 111 each may be implemented as a separate computer or as a software module running on a computer platform running other software servers. In some example implementations, an NMS may be deployed, as a software module, onto one of the servers 110a and 110b, while in other example implementations, the NMS may be implemented as a separate computer connected to the computer network 101, which is part of the private network system of the customer.

Figure 2:
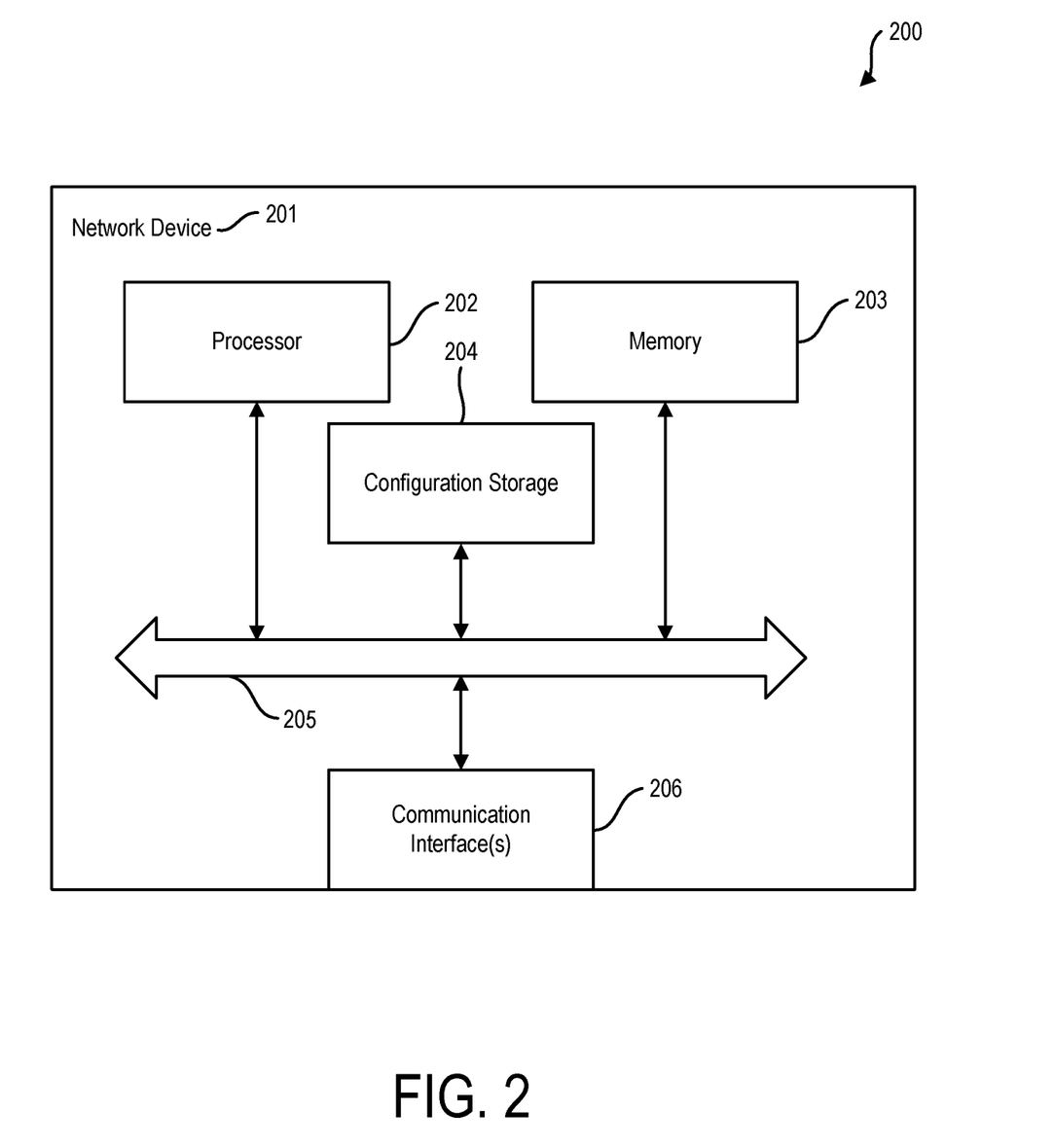
FIG. 2 is a network device structure, according to one or more examples of the disclosure.

FIG. 2 is a network device structure 200, according to one or more examples of the disclosure. In some example implementations, the device structure 200 of a network device 201 may have hardware components including a processor 202, a memory 203, a configuration storage 204, a data bus 205, and a communication interface 206.

In various example implementations, the network device 201 may include other hardware components, depending on the type of the device, such as wireless transmitters and receivers, USB ports, user interface display, and the like, as needed to create or support the functions of the network device 201.

The network device 201 may perform various functions, based on what type of device it is, by sending and receiving data via the communication interface 206, storing the data in the memory 203, and processing the data using processor 202. The data may include information communicated from other devices, servers, networks, as well as data generated by the network device 201 itself. For example, a gateway device between two networks may convert formats of the data received to a format suitable for the receiving network, while a router may perform functions to route a data packet to a correct or intended destination, such as a client device on the same or different network as the origin of the data packet.

When a new network device 201 joins a network, the DHCP server 111 (FIG. 1) at least assigns an internet protocol (IP) network address to the network device 201 to allow communications with other devices and servers on the network. The DHCP server 111 may provide additional information to the network device 201 via the options embedded in DHCP messages, as further described below. The information provided by the DHCP server 111 and/or other entities to the network device 201 may be stored in the configuration storage 204 on the network device 201.

Figure 3:
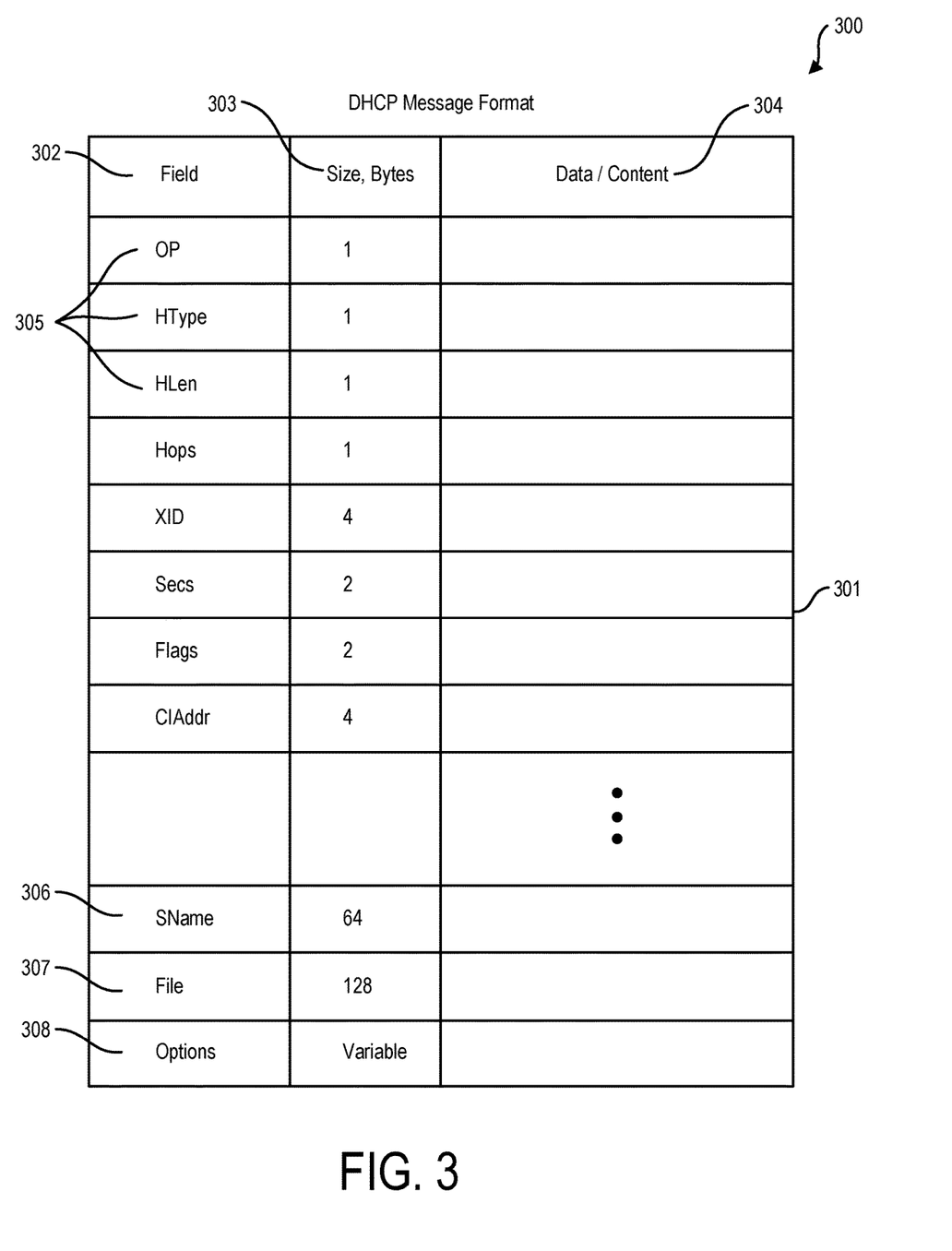
FIG. 3 is a dynamic host configuration protocol (DHCP) message format and some of its various fields, according to one or more examples of the disclosure.

FIG. 3 is a DHCP message format 300 and some of its various fields, according to one or more examples of the disclosure. The DHCP message representation 301 has a total message size, which is variable, obtained by adding the number of bytes of all fields in Size column 303. Those skilled in the art will appreciate that the DHCP message representation 301 is presented as shown and used herein as an abstraction for clarity and ease of communication and that this representation is not an actual DHCP message. The DHCP message representation 301 has many information fields, some of which are fixed in size having a fixed number of bytes, and some others having a variable size depending on the type of message and other options within the DHCP message representation 301. The DHCP message format 300 may be represented with Field column 302, the Size column 303, and a data content column 304. The Field column 302 includes fieldnames 305 in each row. The Size column 303 includes the size of the corresponding field as the number of bytes. And the data content column 304 includes the information content of the DHCP message representation 301. Not all fields of the DHCP message representation 301 are shown in FIG. 3. The server name (SName) field 306 and the File field 307 have fixed sizes of 64 and 128 bytes, respectively, while Options field 308 has variable size depending on what options are set in the Sname field 306 and File field 307.

Various information, such as pre-share key (PSK) used to encrypt data, and other DHCP options may be inserted into the DHCP message representation 301 to allow the network device 201 to join the network securely. Some of the DHCP options used in the process of joining the computer network 101 are described more specifically below.

Figure 4:
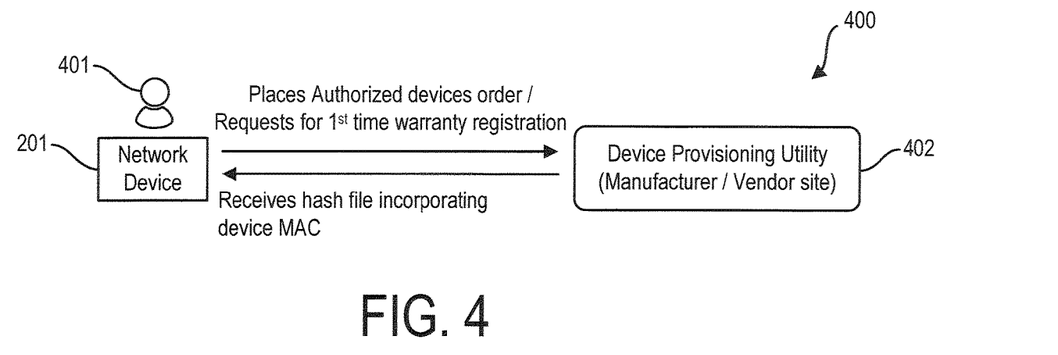
FIG. 4 is a workflow for generating a hash of unique network device identifications (ID), according to one or more examples of the disclosure.

FIG. 4 is a workflow 400 for generating a hash of unique network device identifications, according to one or more examples of the disclosure. In some example implementations, a customer 401 orders one or more network devices, such as the network device 201, from a manufacturer or vendor of the network devices. The device manufacturer may use a device provisioning utility 402 to generate a hash file based on the devices' unique identifiers, such as MAC addresses, at the manufacturer's site. The hash file is provided to the customer 401 to use for validation of any new network device 201 that attempts to connect to and onboard a customer's network. The hash file may be provided and/or stored on a computer-readable medium, such as a magnetic hard disk, an optical disc, a data tape, non-volatile memory, universal serial bus (USB) drive, and other non-transitory data media.

A hash file contains data, also called hash values, generated by a hashing function or hashing algorithm. A hashing algorithm is a method of encryption of data or part of a larger encryption or data security scheme. A hashing function takes the data to be encrypted as its input and generates hash values as its output. There are different hash functions that may be used to generate hash values, however, they all have a few main characteristics in common. These characteristics include fixed-length hash values, even for variable length data, irreversibility (cannot determine input from its corresponding hash value), and uniqueness (two input data do not have the same hash value). If two different inputs generate the same hash value, it is called a collision and the hashing function that generates such collision becomes useless. As such, without having the hash values generated based on the unique IDs of the network devices, the network devices cannot be validated. Conversely, a network device the hash value of which is not in the hash file is not valid.

Figure 5A:
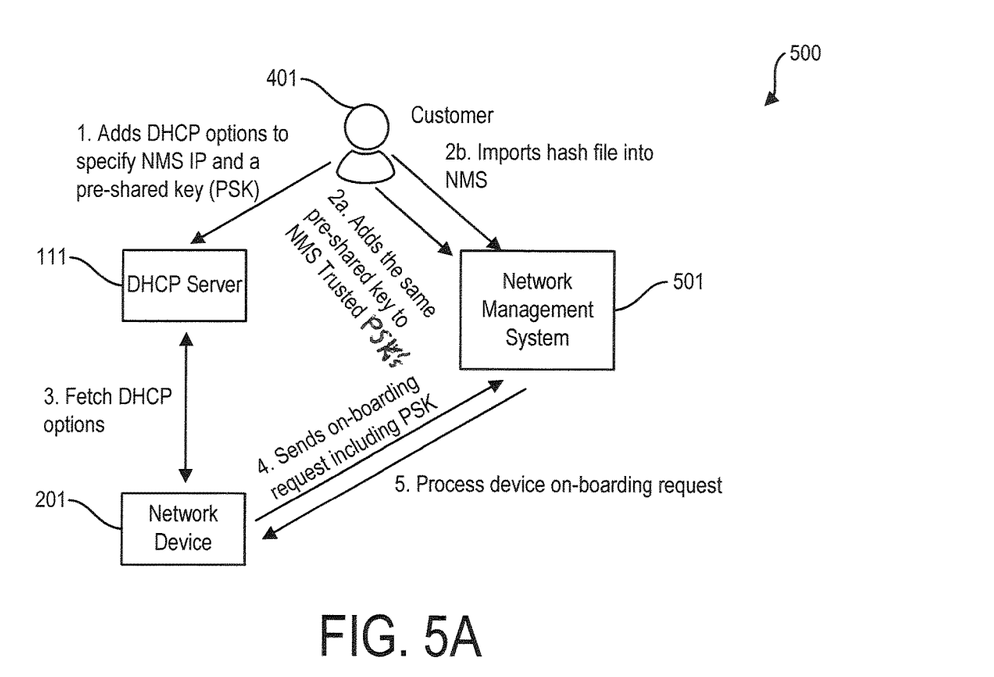
FIG. 5A is a workflow of secure zero-touch provisioning of a network device, according to one or more examples of the disclosure.

FIG. 5A is a workflow 500 of secure zero-touch provisioning of a network device, according to one or more examples of the disclosure. In an example implementation of this workflow, the NMS 501 may use two stages to validate to validate network devices 201 attempting to join or onboard a customer network in an offline deployment.

The various systems, parts, modules and the like mentioned herein, such as DHCP, NMS, and others mentioned later, that perform various functions described in this disclosure may be implemented as hardware, software, or a combination thereof. The software-implemented functional modules may be stored in non-transitory computer-readable media, such as computer memory like RAM or ROM, magnetic storage disks, optical discs, tapes, and the like.

In the first stage, the customer 401 may configure a pre-shared key (PSK) and other information, such as some details about NMS 501, on the DHCP server 111 for a new network device the customer purchased from the device manufacturer, as part of the DHCP server options. This DHCP PSK configuration is in addition to the other standard configuration information, such as the IP address of the NMS 501. The PSK (and other NMS 501 details and parameters such as protocols supported, port addresses, and the like) may be stored in a particular location within the Options fields 308 (for example, a certain byte offset from beginning of the Options field) of the DHCP message representation 301.

The PSK storage location within the DHCP Options field 308 constitutes a proprietary DHCP message format for a particular customer. Only a genuine and authorized network device is programmed to know which option field contains the PSK data. A non-authorized network device does not know and cannot find the correct option field to retrieve the PSK. More specifically, the network device needs to possess intelligence and knowledge of the algorithm to parse out the DHCP option 43. DHCP specifications define options that are relevant to vendor specific information. These are Options 60 and 43. Option 60 is the vendor class identifier (VCI). Option 43 is used by DHCP servers to return vendor specific information. The particular customer may use a specific format for Option 43, such as including a group name and/or an IP address of a controller or a gateway in a particular order, each at a particular byte offset or index within the Option 43 data field. The particular customer's network devices may be designed or programmed to possess the necessary knowledge and intelligence to parse this format and access its contents.

The PSK may be specific to each virtual local area network (VLAN). A VLAN abstracts the idea of the LAN by providing data link layer connectivity for a subnet. One or more network switches may support multiple, independent VLANs, creating Layer 2 (data link, second layer in International Standards Organization—Open System Interconnection (OSI-ISO) 7-layer network model) implementations of subnets. A VLAN is associated with a broadcast domain and is usually composed of one or more Ethernet switches. Each VLAN may have a different DHCP server and mostly a different PSK configured in option 43. This ensures that even if access to one of the VLAN's in the enterprise network is compromised, access to other VLAN's stays secure.

The particular customer may add the same PSK to a list of trusted PSKs stored in the NMS 501. The network device 201, when powered up at the customer site or connected to the customer network, obtains the IP address and PSK of the NMS 501 by parsing the DHCP options in the DHCP message representation 301 during the discovery phase of the DHCP protocol. The network device 201 then initiates a connection with the NMS 501 using the IP address of the NMS 501 and presents the PSK as part of the DHCP connection request message. NMS 501 validates the PSK given by the network device 201 against its trusted PSK list and begins on-boarding the device. This constitutes an example of the first stage of device verification.

In the second stage, the NMS 501 verifies that the network device 201 is a trusted (authorized) network device that was actually procured by the customer. As discussed with respect to FIG. 5A, the customer 401, on procuring a shipment of network devices, is provided a single file that contains the hash values of unique identifiers, such as MAC addresses and/or serial numbers, of all devices that are part of the shipment. In case of direct purchase from the device manufacturer, the hash file may be generated by a cloud-based service and provided to the customer for a particular shipment. In case of indirect purchase from other vendors, the hash file may be generated when the customer connects the network device to the customer's cloud-based service for a first-time warranty registration. After obtaining the hash file containing the hash values for the purchased network devices 201, the customer ingests or stores this file into the NMS 501. During device-onboarding, the NMS 501 verifies the MAC address and/or the serial number of the connecting network device's 201 request against the hash file that was ingested. If there is a match between the two values, then the network device 201 is considered validated and may be onboarded onto the customer's network. The NMS 501 may then on-board the network device 201 and use the details fetched during and after onboarding to populate the NMS 501's device inventory list as part of the provisioning process. After successful onboarding of the network device 201, the NMS 501 may further provision the network device 201 with additional information and parameters as suitable and appropriate for the type of the network device 201. For example, if the network device 201 is a new gateway, the NMS 501 may provide network address information and routing tables. Other types of network devices, such as switches, may need different types of information to function. This constitutes an example of the second stage of device verification.

Figure 5B:
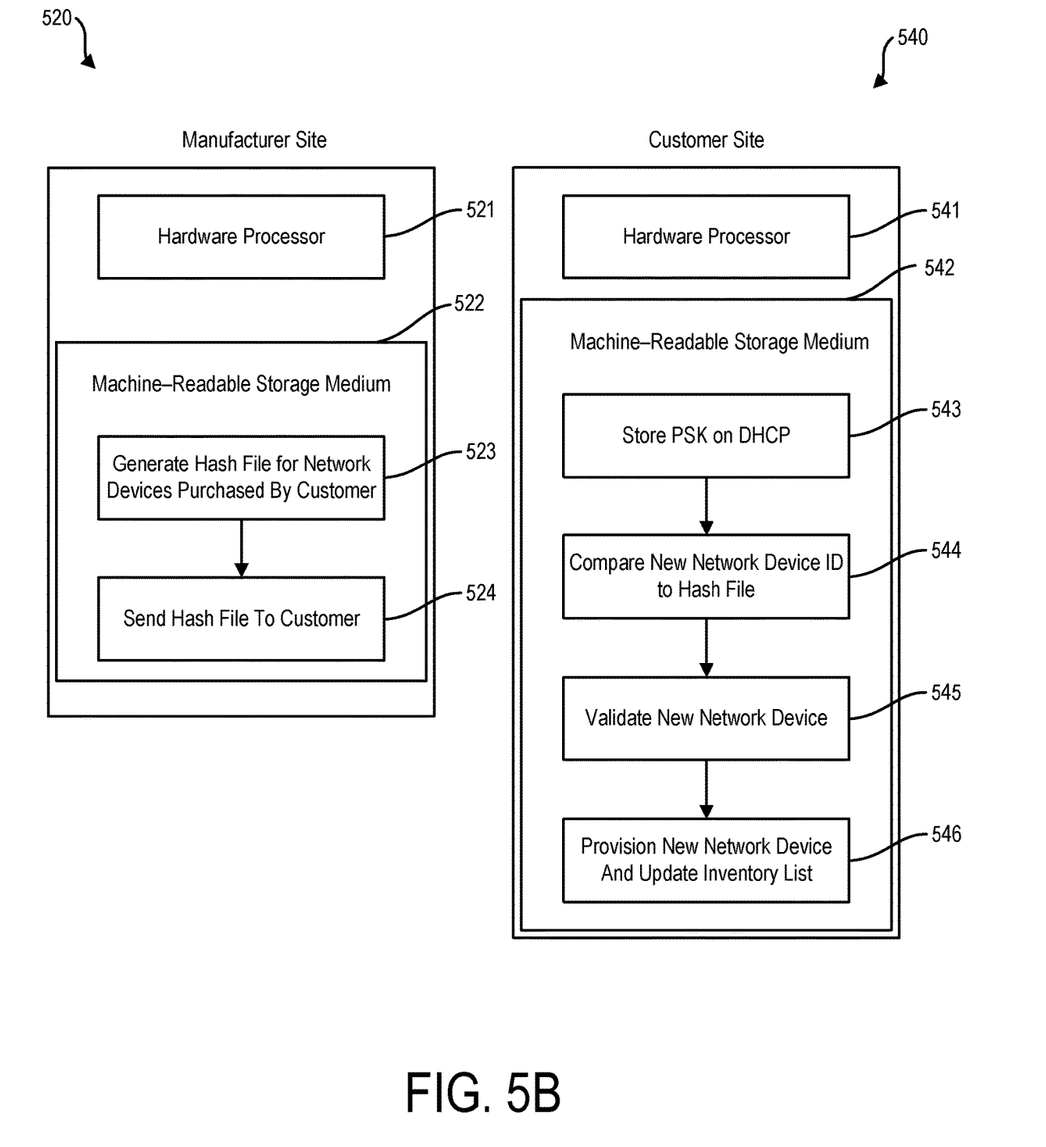
FIG. 5B is a computer-readable medium (CRM) implementation of a secure zero-touch provisioning of a network device, according to one or more examples of the disclosure.

FIG. 5B is a CRM implementation of a secure zero-touch provisioning of a network device, according to one or more examples of the disclosure. A hardware computer system 520 at a site of a manufacturer including a hardware processor 521, the CRM 522 with software instructions 523 and 524 encoded thereon. A hardware computer system 540 at a site of the customer 401 including a hardware processor 541, the CRM 542 with software instructions 543, 544, 545, and 546 encoded thereon.

Those skilled in the relevant arts will appreciate that the CRMs 522 and 542 may be any one or more of the various non-transitory storage media such as magnetic disk, optical disc, non-volatile memory, and the like. The software instructions 523 and 524 and 543-546 may include many lines of code in various computer languages. The blocks of instructions 523, 524, and 543-546 are high level instructions implemented in software, according to one or more examples of the disclosure.

The CRM implementation includes a process similar to the process described herein with respect to FIGS. 4 and 5A. When the customer 401 (see FIG. 4) purchases one or more network devices 201 from the device manufacturer or vendor, the manufacturer may execute, or cause to be execute, a set of software instructions 523 from the machine-readable storage medium 522 on hardware processor 521 to generate a hash file based on the IDs of all the network devices 201 purchased by the customer. The manufacturer may subsequently execute another set of software instructions 524 to transmit the file to the hardware computer system 540 at the customer site.

The customer 401 may execute, or cause to be executed, a set of software instructions 543 from machine-readable storage medium 542 on hardware processor 541 to store PSK and other vendor-specific options on the DHCP server 111. When a new network device 201 attempts to join the customer's computer network 101, it connects to DHCP and obtains the PSK and other information, as described above with respect to FIG. 5, and presents this information to the NMS. The NMS may run software instructions 544 to compare the new network device ID to the hash file. The NMS may also use other sets of software instructions 545 to verify the PSK and validate the new network device 201 attempting to join the private customer computer network 101. Once the new network device 201 is validated in this manner, the software instructions set 546 may be executed to provision the new network device 201 and update the inventory list on the NMS.

Figure 6:
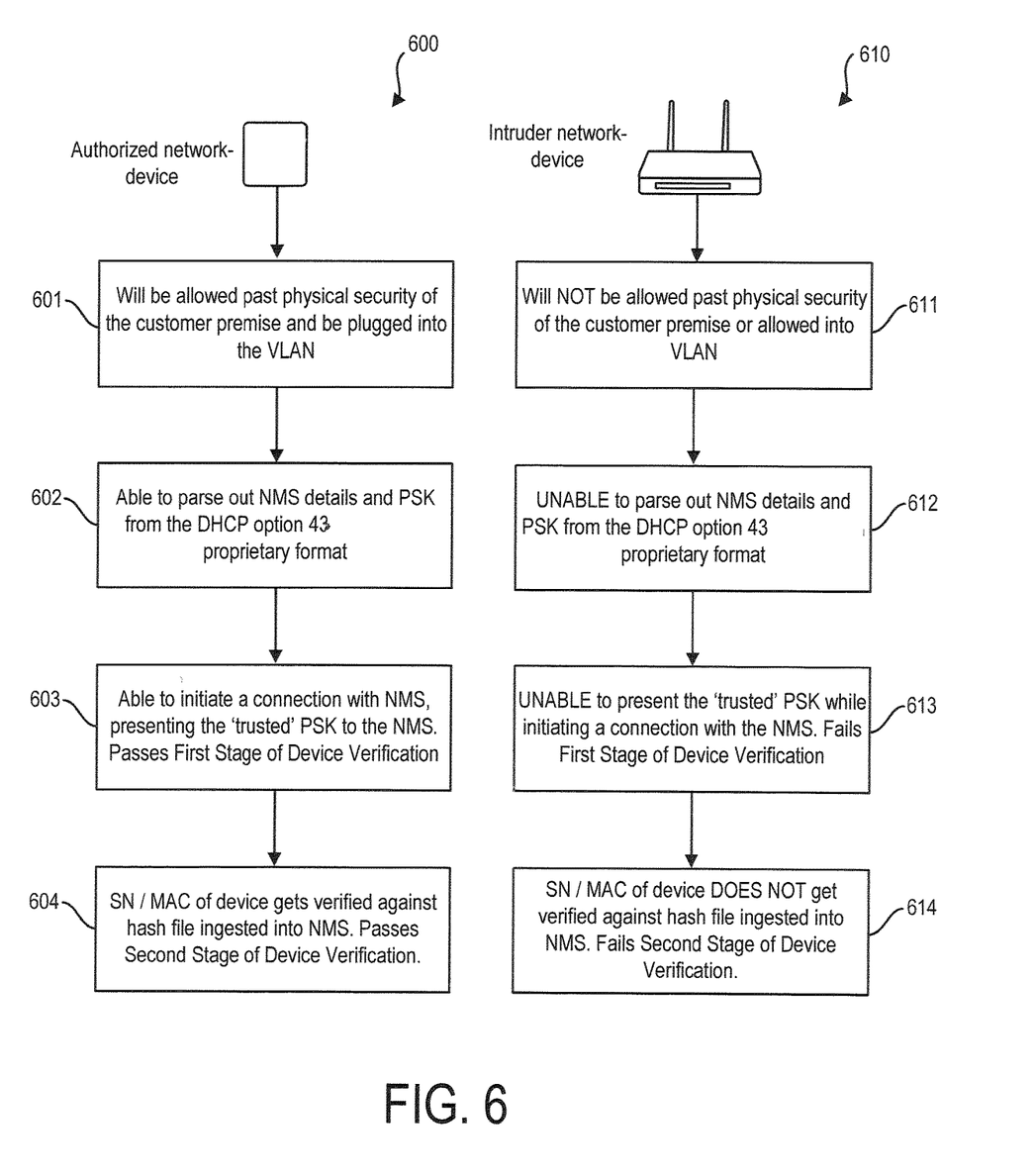
FIG. 6 is a comparison between the process of an authorized network device and the process of an unauthorized network device attempting to join a secure network, according to one or more examples of the disclosure.

FIG. 6 is a comparison between a process 600 of an authorized network device and a process 610 of an unauthorized network device attempting to join a secure network, according to one or more examples of the disclosure. At block 601 of the process, the authorized network device 201 is allowed to enter the physical premises of the customer and be coupled with or plugged into the customer network.

At block 602, the authorized network device parses DHCP data obtained from the DHCP server 111, including NMS 501 details and PSK from a particular location within the Options field 308, according to Option 43 of the DHCP message representation 301. This particular proprietary location is only known to the authorized network devices, which can access the PSK by parsing the DHCP message representation 301 and its options according to this proprietary format.

At block 603, the authorized network device may initiate a connection with the NMS 501 and provide the PSK parsed from the DHCP message representation 301 to the NMS 501. At this point, the authorized network device has passed the first stage of validation discussed with respect to FIG. 6.

At block 604, the NMS 501 compares the unique identifier of the authorized network device, such as its MAC address or serial number, with the hash values in the hash file provided by the device manufacturer. If this comparison is successful, then the authorized network device is considered to have passed stage two, and thus, complete validation process.

Now, with respect to process 610 for unauthorized network devices, at block 611, the unauthorized network device will generally not be allowed on the customer premises to connect with the customer network and attempt to onboard it.

At block 612, even if the unauthorized network device somehow gets into the customer premises and is plugged into the network, it will be unable to parse the NMS 501 details and parameters, and PSK from the DHCP Option 43 with the manufacturer's proprietary format, since it has no knowledge of such format.

At block 613, the unauthorized network device will be unable to present the PSK needed for validation, and hence, fails stage one of the validation.

At block 614, the MAC address and/or the serial number of the unauthorized network device does not match the hash values of an authorized network device, thus, failing the second stage of device verification and validation.

Hence, any unauthorized network device that attempts to join and onboard the secure enterprise network of a customer will fail the two stage validation and the security of the network is protected. The foregoing disclosure describes a number of example implementations of zero touch provisioning on network devices. For purposes of explanation, certain examples are described with reference to the components illustrated in FIGS. 1 to 6.

Examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method of network device provisioning without Internet access, the method comprising:
    entering a pre-shared key (PSK) in a dynamic host configuration protocol (DHCP) message;
    obtaining the PSK from a set of DHCP message options by an onboarding network device requesting to join a private network;
    presenting the PSK, by the onboarding network device, to a network management system (NMS) of the private network;
    joining the private network pursuant to validating the PSK by the NMS upon validation of the onboarding network device based upon generated hash values corresponding to unique IDs of network devices authorized to join the private network, and
    updating an inventory list of the NMS to include the onboarding network device in the inventory list upon the presented PSK matching an NMS-trusted PSK pursuant to a comparison of the presented PSK against a trusted PSK list including the NMS-trusted PSK.

2. The method of claim 1, further comprising comparing, by the NMS, a unique ID of the onboarding network device to a hash file of unique IDs of each network device in the private network to validate the unique ID of the onboarding network device.

3. The method of claim 2, wherein the unique IDs of the network devices are media access control (MAC) addresses.

4. The method of claim 2, wherein the hash file contains the hash values corresponding to the unique IDs of each of the network devices in the private network and is generated by a manufacturer of network devices and provided to the private network.

5. The method of claim 1, wherein the PSK is entered into a vendor-specific field of the DHCP message options.

6. The method of claim 1, wherein the onboarding network device is an Aruba Networks corporation network device.

7. The method of claim 1, wherein NMS parameters are added to vendor-specific options of the DHCP message.

8. A non-transitory computer-readable medium (CRM) having computer instructions for network device provisioning without Internet access encoded thereon that when executed on a processor cause the processor to:
    compare a pre-shared key (PSK) presented by network devices attempting to join a private computer network against a trusted PSK list, the PSK being presented in a dynamic host configuration protocol (DHCP) message, the PSK having been entered in the DHCP message, and having been retrieved from a set of DHCP message options by an onboarding network device requesting to join the private computer network;
    generate hash values corresponding to unique IDs of network devices authorized to join the private computer network;
    provide the hash values to a network management system (NMS) of the private computer network;
    compare a unique ID of the onboarding network device against the hash values; and
    validate the onboarding network device to join the private computer network.

9. The non-transitory CRM of claim 8, wherein the PSK is stored on a DHCP server.

10. The non-transitory CRM of claim 9, wherein the PSK is retrieved from the DHCP server by the onboarding network device attempting to join the private network.

11. The non-transitory CRM of claim 8, wherein the unique IDs of the network devices authorized to join the private network are media access control (MAC) addresses.

12. The non-transitory CRM of claim 8, wherein the hash values are generated by a manufacturer of network devices and transmitted to the NMS to be stored on a non-transitory data medium.

13. The non-transitory CRM of claim 8, wherein validating the onboarding network device using the hash values constitutes a first stage of validating the onboarding network device.

14. The non-transitory CRM of claim 10, wherein the validation of the onboarding network device based on the PSK constitutes a second stage of validation of the onboarding network device.

15. A computer-implemented system for provisioning an onboarding network device without using Internet, the system, including a processor and memory coupled with the processor, comprising:
    a private computer network;
    a dynamic host configuration protocol (DHCP) server having a pre-shared key (PSK) stored thereon, the DHCP server being coupled with the private computer network; and a network management system (NMS) coupled with the private computer network, the NMS comparing the PSK stored on the DHCP server with a PSK, having been entered in a DHCP message, and obtained by the onboarding network device from a set of DHCP message options requesting to join the private computer network, and presented to the NMS in a DHCP connection request message, and comparing a unique ID of the onboarding network device to generated hash values corresponding to unique IDs of network devices authorized to join the private computer network to validate the onboarding network device.

16. The computer-implemented system of claim 15, further comprising a non-transitory computer-readable medium having a hash file encoded thereon accessible to the NMS.

17. The computer-implemented system of claim 16, wherein the hash file includes the generated hash values of unique IDs of authorized network devices of the private computer network.

18. The computer-implemented system of claim 17, wherein the onboarding network device includes information about where to find the PSK in the DHCP message.

19. The computer-implemented system of claim 18, wherein the PSK is stored in a vendor-specific option 43 of the DHCP message.

20. The computer-implemented system of claim 19, wherein a parameter of the NMS is stored in the vendor-specific option 43 of the DHCP message, in addition to the PSK.

* * * * *